United States Patent Office 3,487,018
Patented Dec. 30, 1969

3,487,018
SCALE AND CORROSION CONTROL IN
COOLING WATERS
Edwin S. Troscinski, Oak Lawn, Ill., assignor to Nalco
Chemical Company, Chicago, Ill., a corporation of
Delaware
No Drawing. Filed Apr. 12, 1968, Ser. No. 721,109
Int. Cl. C02b 5/06
U.S. Cl. 210—58           17 Claims

ABSTRACT OF THE DISCLOSURE

Scale and corrosion in cooling waters is inhibited by adding to such waters certain organic phosphate esters and a chromium compound in hexavalent form.

---

Cooling waters are used in many industrial processes in order to remove heat developed in such processes. Such waters ordinarily contain varying amounts of hardness components, such as calcium and magnesium, which tend to form insoluble deposits commonly referred to as "scale." This tendency increases when the water is heated. Since any water containing hardness components when used as a cooling water is gradually heated, the tendency to form scale is increased. At the same time, inasmuch as cooling waters are very often carried in metal tubes or other types of metal containers, there is a corrosion problem.

The problems of scale and corrosion can vary somewhat depending on the pH of the water and the degree of hardness. One of the most effective types of corrosion inhibitors is a chromium compound in the hexavalent form. In the use of such compounds, it has been customary to add an acid to the cooling water in order to reduce the pH because these compounds are not very effective when the cooling water is alkaline. This may be due to the fact that under alkaline conditions the hardness components of the water, such as calcium, react with chromates to form calcium chromate.

In any event, regardless of the cause, it would be desirable to have a cooling water which could be used over a wide pH range without the necessity for adding acid. In this way, raw waters, such as river waters, could be used without pH control and at a substantial saving in expense.

One of the objects of the present invention is to provide a new and improved method of treating cooling waters so that they do not require pH control, and at the same time corrosion and the formation of scale are reduced.

Another object of the invention is to provide a new and improved process for treating alkaline cooling waters so as to inhibit corrosion and scale formation. Other objects will appear hereinafter.

In accordance with the invention these objects are accomplished by the combined treatment of a cooling water with a certain type of organic phosphate ester which is water soluble under the conditions of use and a chromium compound in hexavalent form which is also water soluble under the conditions of use.

The proportions of organic phosphate ester are normally within the range of 0.5 to 100 parts per million parts of cooling water and the proportions of chromium compound are normally within the range of 5 parts to 100 parts per million parts of cooling water.

The pH of the cooling water is normally within the range of 5–10, usually 6–10. The present invention is especially important where the pH is on the alkaline side.

The quantity of organic phosphate ester which will give the optimum results will vary to some extent with the hardness and total alkalinity of the cooling water.

The condition of the cooling water can generally be characterized by hardness in terms of calcium carbonate and total alkalinity as calcium carbonate and the following table illustrates optimum dosages of organic phosphate under different conditions.

| Condition | Ca hardness as $CaCO_3$ in p.p.m. | Total alkalinity as $CaCO_3$ in p.p.m. | Dosage in p.p.m.[1] |
|---|---|---|---|
| 1 | <800 | <150 | 20 |
| 2 | <800 | 150–300 | 30 |
| 3 | <800 | >300 | 40 |
| 4 | >800 | <150 | 30 |
| 5 | >800 | >150 | 40 |

[1] Based on 27% active organic phosphate ester

The hexavalent chromium compound is preferably added as sodium chromate, sodium dichromate or chromic acid but any form of water soluble hexavalent chromium compound which will yield the chromate ion can be used. While the general proportions are within the range of 5–100 p.p.m., it is preferable to add the chromium compound first at a relatively high dosage of about 60 p.p.m. and then at a low dosage of 5–40 p.p.m. The high and low dosage can be alternated. The manner of addition is not a part of this invention.

The organic phosphate ester and the chromium compound can be added separately to the cooling water or they can be premixed to form a scale and corrosion inhibiting additive which when added to the cooling water will produce a chromate ion in amounts within the range of 5–100 p.p.m. and an organic phosphate ester in amounts within the range of 0.5–100 p.p.m.

The optimum dosages of the organic ester can also be determined from the stability index of the cooling water. The following is a guide for initial dosages based on stability index.

Condition:                                       Dosage [1] (p.p.m.)
   Slightly scale forming Stability Index 5.5–6 __ 5–10
   Moderately scale forming Stability Index
     4–5 _____ 10–20
   Severely scale forming Stability Index less
     than 3 _____ 20–50

[1] Based on 27% active organic phosphate ester.

An important feature of the invention is that the treatment can be employed effectively not only over a wide pH range but also at high temperatures, even as high as 350° F., and at long holding times. It can be used in once-through systems or in recirculating systems.

It should be noted that inorganic polyphosphates are not generally successful in controlling scale and corrosion under conditions of high temperature, long holding time or high pH.

The organic phosphate esters useful for the purpose of the invention are made by reacting phosphorus pentoxide, or polyphosphoric acid (e.g., 115% polyphosphoric acid), or mixtures thereof, with polyoxylated polyhydric (polyhydroxy) compounds.

The preferred polyoxyalkylated polyhydric compounds are either oxyethylated or oxypropylated-terminally oxyethylated polyhydric compounds such as polyoxyethylated glycerol, sorbitol, mannitol or trimethylolpropane. Other compounds which may be either oxyethylated or oxypropylated-terminally oxyethylated for the purposes of this invention include erythritol, arabitol, xylitol, quercitol, inositol, and mono-, di-, or tri-pentaerythritol.

The polyoxyalkylated polyhydric compounds are phosphated by reaction with phosphorus pentoxide at elevated temperature in the order of about 95–150° C. The reaction time is preferably at least about 30 minutes. The reaction may be conducted longer, however, e.g., up to 3–5 hours, to assure complete reaction. If desired, a catalyst such as $BF_3$ etherate complex may be used.

The resultant reaction product may be used as is, or it may be converted to the alkali metal salt by partial to complete neutralization with an alkali metal base such as potassium or sodium hydroxide, potassium or sodium carbonate, and the like.

The polyhydroxy compounds contain at least one, and preferably an average of at least about two, 2-hydroxyethyl groups (—CH$_2$CH$_2$OH) provided by the oxyethylation. The primary hydroxyl groups thereof are more effective than the secondary hydroxyl groups which would be provided by oxypropylation (—CH$_2$CH(CH$_3$)—OH)

However, oxypropylation may be used if the oxypropylated product is then oxyethylated to provide terminal 2-hydroxyethyl groups.

The compositions of the invention comprise a phosphated polyhydroxy composition derived by the reaction of phosphorus pentoxide and a polyol composition of the formula $$(HO—)_xR[—O(R_1O—)_zCH_2CH_2OH]_y$$

wherein R is a saturated, hydrocarbon radical having 3-6 carbon atoms, R$_1$ is a member selected from the group consisting of —CH$_2$CH$_2$— and

—CH$_2$CH(CH$_3$)—

$x$ is a number average in the range of 0–5, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of $$-O-\overset{O}{\underset{OH}{\overset{\|}{P}}}-OH$$

and $$-O-\overset{O}{\underset{OH}{\overset{\|}{P}}}-O-$$

Also, the invention embraces the alkali metal salts thereof derived by the partial to complete neutralization of the phosphate ester groups with an alkali metal base.

Preferred embodiments include those in which said polyol composition is derived by oxyethylation of glycerol with 1.5 to 2.5 moles of ethylene oxide per mole of glycerol; those in which said polyol composition is derived by the oxyethylation of mannitol with about 2–20 moles of ethylene oxide per mole of mannitol; those in which said polyols are derived by the oxyethylation of sorbitol with about 2–20 moles of ethylene oxide per mole of sorbitol; and those in which said polyol is derived by the oxyethylation of trimethylolpropane with 1.5 to 2.5 moles of ethylene oxide per mole of trimethylolpropane.

The invention further embraces a process of the type described utilizing a hardness-ion-precipitation-preventing quantity in the order of 0.5–100 parts per million of a phosphated polyhydroxy composition derived by the reaction of phosphorus pentoxide and/or polyphosphoric acid and a polyol composition of the formula $$(HO—)_xR[—O(R_1O—)_z CH_2CH_2OH]_y$$

wherein R is a saturated hydrocarbon radical having 3–6 carbon atoms, R$_1$ is a member selected from the group consisting of —CH$_2$CH$_2$— and

—CH$_2$CH(CH$_3$)—

$x$ is a number average in the range of 0–5 inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of $$-O-\overset{O}{\underset{OH}{\overset{\|}{P}}}-OH$$

and $$-O-\overset{O}{\underset{OH}{\overset{\|}{P}}}-O-$$

The process also includes use of alkali metal salts derived by partial to complete neutralization of the phosphate ester groups with an alkali metal base.

The following examples illustrate the preparation of phosphate esters suitable for the practice of the invention.

EXAMPLE 1

Glycerine and finely ground potassium hydroxide are charged into an oxyalkylation reactor and are heated to 150° C. while purging the reactor with natural gas. Ethylene oxide is added slowly at 150–160° C. until the weight amount of added ethylene oxide equals the weight of the glycerine. The reactor contents are recycled for an additional hour after all the ethylene oxide is added to assure essentially complete oxyalkylation. The weight of the added KOH was about 0.1% of the total weight of glycerine and ethylene oxide.

The phosphating procedure comprises charging 550 parts of the above polyoxyethylated glycerine and 115 parts of n-propanol, the latter as a viscosity control agent, into a vessel free from moisture and oily or other foreign material. The charge is heated to 50° C., whereupon 456 parts of phosphorous pentoxide is added in small amounts whereby the exothermic reaction is controlled by the rate of addition and by cooling to maintain a temperature of 80–90° C. When 360 parts of P$_2$O$_5$ has been added, the temperature is allowed to increase to the range of 130–135° C. for about 2 hours, or less if the clarity of the reaction mass indicates complete reaction.

With the reactor on full cooling, 1830 parts of tap water is added, slowly in the initial phase of water addition. Cooling is continued, and when the temperature is below 60° C., 6 parts of sodium molybdate (a corrosion inhibitor) and 240 parts of flake caustic are added. The temperature is maintained below 90° C. during flake caustic addition.

Then 20 parts of a sulfonated tannin, which is commercially available under the trademark Rayflo, 286 parts of n-propanol and 215 parts of methanol are added and the mass is stirred until uniform. The final pH is adjusted to a value between 4.0 and 4.5.

Examples of further oxyethylated polyhydric compounds which can be obtained by the oxyalkylation procedure of Example 1 and can be phosphated as therein described are as follows:

TABLE 1.—OXYALKYLATED COMPOUNDS

| Example | Polyhydric compound | | Parts ethylene oxide |
|---|---|---|---|
| | Name | Parts | |
| 2 | Glycerine | 410 | 390 |
| 3 | do | 276 | 524 |
| 4 | do | 234 | 670 |
| 5 | do | 590 | 111 |
| 6 | do | 320 | 920 |
| 7 [1] | Trimethylolpropane | 930 | 653 |
| 8 | Sorbitol | 250 | 550 |
| 9 | do | 220 | 960 |
| 10 [2] | Mannitol | 266 | 113 |
| 11 | do | 234 | 234 |
| 12 | Glycerine g | 200 | 200 |

[1] Catalyst, $BF_3$ etherate complex.
[2] Solvent, dioxane.

TABLE 2.—PHOSPHATED OXYALKYLATED COMPOUNDS

| Example | Oxyalkylated compound | | Parts $P_2O_5$ | Reaction time after $P_2O_5$ addition, hr. | Temp., 0° C. | Parts water added | Parts flake caustic | Parts alkanol added after Rxn. |
|---|---|---|---|---|---|---|---|---|
| | Ex. | Parts | | | | | | |
| 13 | 2 | 200 | 120 | 3 | 140 | 320 | 0 | 0 |
| 14 | 2 | 200 | 120 | 3 | 140 | 383 | 32 | [7] 32 |
| 15 | 2 | 200 | 60 | 0.75 | 100–110 | 335 | 45 | 0 |
| 16 | 2 | 200 | [1] 60 | 0.50–0.75 | 100–110 | 335 | 45 | 0 |
| 17 | 2 | 200 | [1] 100 | | | 305 | 60 | 0 |
| 18 | 2 | 200 | [1] 100 | | | 360 | 70 | 0 |
| 19 | 2 | 200 | [1] 120 | | | 600 | 60 | 0 |
| 20 | 6 | 300 | [2] 100 | | | 560 | 0 | 0 |
| 21 | 2 | 150 | [1] 60 | 0.50 | 190 | 390 | Note 1 | 0 |
| 22 | 2 | 150 | [3] 120 | 2–3 | 120 | 510 | do | 0 |
| 23 | 6 | 150 | [3] 140 | 1 | 100 | 470 | do | 0 |
| 24 | 2 | 150 | 90 | 0.50 | 185 | 450 | do | 0 |
| 25 | 2 | 150 | [2] 90 | 0.50 | 180 | 450 | do | 0 |
| 26 | 12 | 150 | [4] 130 | 0.50 | 150 | 540 | do | [8] 20 |
| 27 | 12 | 150 | [4] 130 | 0.50 | 185 | 540 | do | [8] 20 |
| 28 | 12 | 150 | [1] 70 | To compl. | 120 | 410 | do | [8] 50 |
| 29 | 12 | 150 | [5] 90 | 0.5 | 100–110 | 495 | do | 0 |
| 30 | 7 | 930 | 50 | 5 | 100 | 200 | 0 | 0 |
| 31 | 7 | 930 | 90 | 5 | 100 | 200 | 0 | 0 |
| 32 | 8 | 200 | 10 | 3 | 90–100 | 200 | 0 | 0 |
| 33 | 9 | 200 | 20 | 3 | 90–100 | 200 | 0 | 0 |
| 34 | 8 | 200 | [6] 110 | 3 | 100 | 310 | 0 | 0 |
| 35 | 10 | 200 | 90 | 3 | 108 | 290 | 0 | 0 |
| 36 | 11 | 200 | [1] 90 | 3 | 108 | 290 | 0 | 0 |
| 37 | 11 | 200 | 90 | 3 | 108 | 290 | 0 | 0 |

[1] 2.5 cc. $BF_3$. [2] 3 cc. $BF_3$. [3] 50 parts n-propanol added before $P_2O_5$. [4] 30 parts n-propanol added before $P_2O_5$.
[5] 20 parts dioxane added before $P_2O_5$. [6] 5 parts flake caustic soda added with $P_2O_5$. [7] Methanol. [8] n-Propanol.
NOTE 1.—Sufficient to neutralize.

EXAMPLE 38

In a reaction vessel equipped with a stirrer and cooling means, 150 parts of the oxyethylated glycerol of Example 2 and 30 parts of n-propanol are held at a temperature below 125–130° C. while adding 130 parts $P_2O_5$. When the reaction mass becomes clear, it is cooled. To the cooled product is added 20 parts n-propanol and 540 parts water, and then the product is neutralized with flake caustic.

EXAMPLE 39

In a reaction vessel equipped with cooling means and a stirrer, 150 parts of the oxyethylated glycerol of Example 12 and 150 parts of dioxane as solvent, are held by cooling at a temperature below 100° C. while adding 90 parts $P_2O_5$. The temperature is then raised and 127 parts dioxane is distilled off. After cooling, the reaction product is diluted with 525 parts water and is neutralized with flake caustic soda.

EXAMPLE 40

The solution of Example 39 (880 parts) is blended with 100 parts methanol and 20 parts of a sulfonated tannin as described in Example 38.

Lower alkanols, particularly n-propanol, may be present in the $P_2O_5$ reaction as viscosity control agents. Lower alkanol phosphates which form by the reaction of the alkanol and $P_2O_5$ are not particularly active as scale inhibitors.

The following example illustrates the practical application of the invention.

EXAMPLE 41

Ten p.p.m. of the composition of Example 1 was added to a cooling water having a total hardness of 950 p.p.m. as calcium carbonate of which 800 p.p.m. was calcium, as calcium carbonate, and 150 p.p.m. was magnesium, expressed as calcium carbonate. This water, before adding the organic phosphate ester, had a pH of 8.8 and a total alkalinity of 145 p.p.m., as calcium carbonate. Sodium dichromate was also added to the water in an amount sufficient to give a $CrO_4$ concentration of 15 p.p.m. This water, without the addition of the organic phosphate ester when tested for scale and corrosion, gave a scale deposit of 36 milligrams (mg.) on a steel test coupon, a corrosion rate of 2.5 mils per year (m.p.y.) on said coupon, a scale deposit of 1718 mg. when tested in a steel tube of the type used in heat exchangers, and a corrosion rate of 1.1 m.p.y. in such tube.

With the addition of 10 p.p.m. of the composition of Example 1, the deposit on the steel test piece was reduced to 32 mg. and the corrosion rate to 0.8 m.p.y. The deposit in the tube was decreased to 480 mg. without substantial change in the corrosion rate.

EXAMPLE 42

The procedure was the same as in Example 41 except that the dosage of organic phosphate ester was increased to 15 p.p.m. The pH of the water was 8.8 and the total alkalinity was 200 p.p.m. as calcium carbonate. The deposit on the steel test coupon was 20 mg., the corrosion rate was 0.6 m.p.y., the deposit on the test tube was 522 mg., and the corrosion rate was 1.2 m.p.y.

EXAMPLE 43

The procedure was the same as in Example 41 except that the dosage of organic phosphate ester was increased to 20 p.p.m. and the total alkalinity was 180 p.p.m. The deposit on the steel test coupon was 24 mg., the corrosion rate was 0.9 m.p.y., the tube deposit was 825 mg. and the corrosion rate was 1.8 m.p.y.

EXAMPLE 44

The procedure was the same as in Example 43 except that 10 p.p.m. of aluminum oxide were added to the test water. The pH was 8.6, the total alkalinity was 140 p.p.m., the deposit on the steel test coupon was 31 mg., the corrosion rate was 1.6 m.p.y., the deposit on the tube was 1080 mg. and the corrosion rate of the tube was 1.4 m.p.y.

EXAMPLE 45

The procedure was the same as in Example 43 except that 3 p.p.m. of iron was added to the cooling water. The pH was 8.7, the total alkalinity was 175 p.p.m. as calcium carbonate, the steel test coupon contained a deposit of 27 mg., the corrosion rate was 1.2 m.p.y., the tube deposit was 582 mg. and the corrosion rate was 1.9 m.p.y.

EXAMPLE 46

The procedure was the same as in Example 43 except that the water had a total hardness of 1200 p.p.m. as calcium carbonate of which 800 p.p.m. was calcium and 400 p.p.m. was magnesium, expressed as calcium carbonate. The pH was 8.8, the total alkalinity was 190 p.p.m., the test coupon deposit was 28 mg., the corrosion rate was 1.4 m.p.y. on the steel test coupon, the tube deposit was 574 mg. and the corrosion rate on the tube was 0.8 m.p.y.

EXAMPLE 47

The procedure was the same as in Example 46 except that the dosage of the composition of Example 1 was raised to 40 p.p.m. The steel test coupon deposit was 31 mg., the corrosion rate of the coupon was 1.4 m.p.y., the tube deposit was 459 mg. and the corrosion rate of the tube was 0.9 m.p.y.

EXAMPLE 48

The cooling water used had a total hardness of 1350 p.p.m. of which 1200 p.p.m. was calcium, as calcium carbonate, and 150 p.p.m. was magnesium, expressed as calcium carbonate. The pH was 8.8 and the total alkalinity was 150 p.p.m. With the addition of 15 p.p.m. $CrO_4$ but without the addition of any organic phosphate ester, the test coupon gave a deposit of 37 mg. and a corrosion rate of 2.0 m.p.y. The tube deposit was 1184 mg. and the corrosion rate 1.8 m.p.y.

With the addition of 20 p.p.m. of the composition of Example 1, the coupon deposit was 31 mg., the corrosion rate of the coupon was 1.6 m.p.y., the tube deposit was 628 mg. and the corrosion rate of the tube was 0.8 m.p.y.

EXAMPLE 49

The procedure was the same as in Example 48 except that 40 p.p.m. of the composition of Example 1 was added. The combined effect of this addition and the 15 p.p.m. of $CrO_4$ gave a coupon deposit of 22 mg., a corrosion rate of 1.2 m.p.y. on the coupon, a tube deposit of 291 mg. and a corrosion rate of 0.7 m.p.y. on the tube.

EXAMPLE 50

The procedure was the same as in Example 48 except that the test water contained 1650 p.p.m. total hardness as calcium carbonate, of which 1500 p.p.m. was calcium as calcium carbonate, and 150 p.p.m. was magnesium, expressed as calcium carbonate. Upon the addition of 15 p.p.m. of chromate and 20 p.p.m. of the composition of Example 1, the pH was 8.7 and the total alkalinity 155, expressed as calcium carbonate. The coupon deposit was 26 mg., the corrosion rate 1.3 m.p.y. on the coupon, the tube deposit was 362 mg. and the corrosion rate 0.9 m.p.y. on the tube.

EXAMPLE 51

The procedure was the same as in Example 49 except that the cooling water used had a total hardness of 1950 p.p.m. as calcium carbonate, of which 1800 p.p.m. was calcium as calcium carbonate, and 150 was magnesium, expressed as calcium carbonate. The combined effect of 15 p.p.m. $CrO_4$ and 40 p.p.m. of the composition of Example 1 gave a coupon deposit of 24 mg., a corrosion rate of 0.9 m.p.y. on the coupon, a tube deposit of 372 mg. and a corrosion rate of 0.9 m.p.y. on the tube.

EXAMPLE 52

The process of the invention was employed in a commercial installation in which there were five cascading cooling towers. The makeup water entered the first cooling tower only and the blowdown from the first tower was the makeup for the second, and so on. The calcium hardness in the first cooling tower ranged between 250 to 300 p.p.m., calculated as calcium carbonate, and in the fifth cooling tower it was between 900 and 1000 p.p.m. No pH adjustment was used. The pH in the fifth cooling tower was 9. Prior to treatment of the water some corrosion had been taking place but the major problem was calcium carbonate scaling in all of the cooling towers. The scaling was so severe that cleaning was required every two weeks. The plant was put on a chromate treatment whereby cromate was added to the water initially at a dosage of 60 p.p.m. for 4 days and thereafter at a dosage of 15 p.p.m. as $CrO_4$. This did not alleviate the conditions mentioned above. The composition of Example 1 was then added at the rate of 10 p.p.m. in the first tower so that the concentration in the fifth tower was approximately 80 p.p.m.

After operating one month there was no evidence of any heat transfer loss and no cleaning was necessary. Under the previous operation conditions it would have been necessary to clean twice in the first two cooling towers.

The compositions of Examples 2 to 40 can be similarly employed.

In the foregoing examples, the test method used was that described in Materials Protection for October 1962, pp. 22–30.

It should also be noted that in Examples 41 to 52 the composition of Example 1 contains about 27% organic phosphate ester.

The combined use of organic phosphate ester and chromate has been employed not only in the treatment of water which is passed through ferrous metal heat exchangers or cooling towers, but also in the treatment of water where the cooling system contains copper alloys, such as admiralty metal. Ordinarily, as the pH is increased, corrosion of copper alloys, such as admiralty metal, tends to increase but in the practice of this invention it has been found that there is no substantial difference in the corrosion rate at pH 9.

It should also be understood that the invention contemplates the use of various dosages at different times in the same system. For example, in starting a system on this treatment, it would be convenitonal to operate at a high dosage level for four days and thereafter at a low dosage level. The high dosage level might be, for example, 60 to 80 p.p.m. of $CrO_4$ and the same amount of the organic phosphate ester. The low dosage level would be 5 to 40 p.p.m. of $CrO_4$ and the same amount of the organic phosphate ester.

The invention makes it possible to control calcium and magnesium scales, including calcium carbonate and calcium sulfate. The invention also makes it possible to reduce or eliminate the addition of acid which has heretofore been employed to control pH in chromate-type corrosion treatments.

The invention is hereby claimed as follows:

1. In a cooling water system in which water is used for cooling solid surfaces and wherein scale and corrosion occur, the process which comprises introducing into said water a corrosion inhibiting amount of a water soluble hexavalent chromium compound which liberates the $CrO_4$ ion in solution and a scale inhibiting amount of an organic phosphate ester which is soluble in water under conditions of use, said ester being obtained by reacting a substance from the class consisting of phosphorus pentoxide, polyphosphoric acid, and mixtures thereof, with a polyoxyalkylated polyhydroxy compound having the formula

wherein R is a saturated hydrocarbon radical having 3–6 carbon atoms, $R_1$ is a member selected from the group consisting of $—CH_2CH_2—$ and

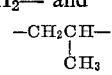

x is a number average in the range of 0-5 inclusive, y in a number average in the range of 1-6 inclusive, and the sum of x plus y equals 3-6, and z is a number average in the range of 0-3 inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups, said phosphate ester groups consisting essentially of one or both of a member selected from the group consisting of

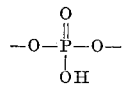

and

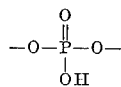

2. A process as claimed in claim 1 in which said phosphate ester has been at least partially neutralized to form a salt.

3. A process as claimed in claim 1 in which the amount of said phosphate ester is within the range of 0.5 to 100 parts per million parts by weight of water.

4. A process as claimed in claim 1 in which said polyoxyalkylated polyhydroxy compound is obtained by oxyethylating glycerine with 1.5 to 2.5 moles of ethylene oxide per mole of glycerine.

5. A process as claimed in claim 1 in which said polyoxyalkylated polyhydroxy compound is obtained by oxyethylating mannitol with about 2-20 moles of ethylene oxide per mole of mannitol.

6. A process as claimed in claim 1 in which said polyoxyalkylated polyhydroxy compound is obtained by oxyethylating sorbitol with about 2-20 moles of ethylene oxide per mole of sorbitol.

7. process as claimed in claim 1 in which said polyoxyalkylated polyhydroxy compound is obtained by oxyethylating trimethylolpropane with 1.5 to 2.5 moles of ethylene oxide per mole of trimethylolpropane.

8. A process as claimed in claim 1 in which said phosphate ester is obtained by the reaction of phosphorus pentoxide and a polyol composition of the formula

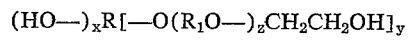

wherein R is a saturated hydrocarbon radical having 3-6 carbon atoms, $R_1$ is a member selected from the group consisting of —$CH_2CH_2$— and

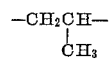

x is a number average in the range of 0-5 inclusive, y in a number average in the range of 1-6 inclusive, and the sum of x plus y equals 3-6, and z is a number average in the range of 0-3 inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of

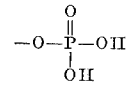

and

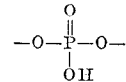

9. A process as claimed in claim 1 in which the amount of $CrO_4$ ion in solution is within the range of 5 to 100 p.p.m.

10. A process as claimed in claim 1 in which the amount of organic phosphate ester is within the range of 0.5 to 100 p.p.m.

11. A process as claimed in claim 1 in which said water has a pH within the range of 5 to 10.

12. A process as claimed in claim 11 in which said water is alkaline.

13. A process as claimed in claim 1 in which said water has a Stability Index of 5.5-6.

14. A process as claimed in claim 1 in which said water has a Stability Index of 4-5.

15. A process as claimed in claim 1 in which said water has a Stability Index of less than 3.

16. A scale and corrosion inhibiting composition consisting essentially of at least one hexavalent chromium compound capable of liberating $CrO_4$ ions in water and an organic phosphate ester, the proportion of said chromium compound being sufficient to produce a $CrO_4$ concentration of 5 to 100 p.p.m. and the proportion of said organic phosphate ester being sufficient to produce an organic phosphate ester concentration of 0.5 to 100 p.p.m. when said composition is added to water, said organic phosphate ester being an organic phosphate ester as defined in claim 1.

17. A scale and corrosion inhibiting composition consisting essentially of at least one hexavalent chromium compound capable of liberating $CrO_4$ ions in water and an organic phosphate ester, the proportion of said chromium compound being sufficient to produce a $CrO_4$ concentration of 5 to 100 p.p.m. and the proportion of said organic phosphate ester being sufficient to produce an organic phosphate ester concentration of 0.5 to 100 p.p.m. when said composition is added to water, said organic phosphate ester being an organic phosphate ester as defined in claim 8.

References Cited

UNITED STATES PATENTS 3,341,467  9/1967  Hwa _____ 252—181 X

MICHAEL E. ROGERS, Primary Examiner

U.S. Cl. X.R.

21—2.7; 252—181, 389

UNITED STATES PATENT OFFICE
CERTIFICATE OF CORRECTION

Patent No. 3,487,018                       December 30, 196(

Edwin S. Troscinski

It is certified that error appears in the above identified patent and that said Letters Patent are hereby corrected as shown below:

Column 3, line 52, that portion of the formula reading "P-O" should read -- P-O- --. Column 5, Table I, under the heading "Name", example 12, "Glycerineg" should read -- Glycerine --. Column 7, line 3, "1.9" should read -- 1.0 --.

Signed and sealed this 5th day of May 1970.

(SEAL)
Attest:

Edward M. Fletcher, Jr.
Attesting Officer

WILLIAM E. SCHUYLER, JR
Commissioner of Patents